(12) United States Patent
Spoelstra

(10) Patent No.: US 7,266,948 B2
(45) Date of Patent: Sep. 11, 2007

(54) METHOD AND DEVICE FOR SEPARATING GASES AND/OR LIQUIDS

(75) Inventor: Symen Spoelstra, Den Helder (NL)

(73) Assignee: Stitchting Energieonderzoek Centrum Nederland (NL)

( * ) Notice: Subject to any disclaimer, the term of this patent is extended or adjusted under 35 U.S.C. 154(b) by 362 days.

(21) Appl. No.: 10/938,251

(22) Filed: Sep. 10, 2004

(65) Prior Publication Data

US 2005/0066665 A1 Mar. 31, 2005

(51) Int. Cl.
*F25B 9/00* (2006.01)
*F25J 1/00* (2006.01)

(52) U.S. Cl. .............................................. 62/6; 62/617
(58) Field of Classification Search ...................... 62/6, 62/617, 912
See application file for complete search history.

(56) References Cited

U.S. PATENT DOCUMENTS 4,433,990 A * 2/1984 Olszewski .................. 62/648
4,778,498 A * 10/1988 Hanson et al. ............... 62/623
4,987,744 A * 1/1991 Handley et al. .............. 62/623
5,386,075 A * 1/1995 Keil et al. .................... 585/800
6,269,658 B1 * 8/2001 Royal et al. .................. 62/643
6,868,690 B2 * 3/2005 Faqih .......................... 62/291

FOREIGN PATENT DOCUMENTS

CH          290878       5/1953
DE          19960966 A   7/2001

OTHER PUBLICATIONS

PCT International Search Report, Jun. 13, 2003.

* cited by examiner

*Primary Examiner*—William C. Doerrier
(74) *Attorney, Agent, or Firm*—Greenberg Traurig, LLP

(57) ABSTRACT

Method and device for separating gases and/or liquids in a vertical column (1). The top product (4) of the column (1) is cooled and partly recycled. The bottom product (3) of the column (1) is heated and partly recycled. Cooling and heating take place with the aid of a thermoacoustic heat pump (10), which can be driven by external heating (2). A relatively large temperature difference between top product and bottom product can be overcome by this means.

10 Claims, 2 Drawing Sheets

METHOD AND DEVICE FOR SEPARATING GASES AND/OR LIQUIDS

The present invention relates to a physicochemical method carried out in one or more reactors, wherein heat is supplied to one location in the reactor or reactors and heat is removed from another location in said reactor, the temperature at said one location being higher than the temperature at said other location and transport of heat from said other location to said one location being effected by means of a heat pump.

A method of this type is known in the state of the art. In the case of distillation of gases or gas mixtures from liquids a top product and a bottom product are produced in a vertical separating column. In this context it is known that heat is recovered from the top product and delivered to the bottom product, after which one of the two products is partially recycled to the column. In this way the desired temperature difference that is needed for the separation is maintained in the most energy efficient manner possible. Because the absolute temperature of the top product is lower than the absolute temperature of the bottom product, a simple heat exchanger cannot suffice. Therefore, in the prior art heat pumps are proposed to bridge such a temperature difference. An appreciable saving in energy can be obtained by this means. Such a heat pump or heat transformer is generally based on a motor acting as a compressor, by means of which a gas at a higher temperature is condensed by bringing it under a higher pressure. By means of condensation heat transport to the bottom stream can be achieved.

Heat pumps have the disadvantage that these have maximum efficiency when bridging a relatively small temperature difference. With known heat pumps a relatively heavy-duty compressor is needed when bridging a larger temperature difference and a great deal of additional energy has to be introduced, as a result of which the saving in energy by the heat pump rapidly falls.

The aim of the present invention is further to improve the method described above in such a way that heat transport can take place with a relatively low supply of additional energy, even when there is a relatively large difference in temperature between the one location and the other location.

This aim is achieved with an above method in that the heat transport takes place with the aid of a thermo-acoustic heat pump.

A thermo-acoustic heat pump is known per se. This consists of a motor and a pump that are coupled by a resonator (tube). A sound wave is generated by the motor and energy is transferred with the aid of this sound wave. With the aid of such a sound wave a relatively high difference in temperature can be bridged in the pump.

Such a sound wave can be generated in any manner known in the state of the art. Preferably, this is generated by a temperature difference, as a result of which a standing wave is produced in the resonator. Use of such a thermo-acoustic pump in combination with physicochemical methods is found to function surprisingly well.

According to an advantageous embodiment of the invention, the method described above comprises distillation of gases from liquid. Preferably the reactor and/or reactors comprises a vertical column wherein the one location, that is to say the hot location, is the bottom and the other location, the cold location, is the top of the column.

According to a further advantageous embodiment, energy is supplied separately to the motor of the thermo-acoustic heat pump. This energy can be either mechanical/electrical energy or heat This heat can, for example, originate from a burner, but can equally well originate from any another conceivable source of heat. The cooling is supplied by the hot bottom outlet of the column, which is then further heated. Furthermore, this stream that has been further heated can be fed to the pump of the thermo-acoustic heat pump and heated even further in the latter as the top stream from the column is cooled. Of course, product is tapped off from the top stream and/or the bottom stream at desired locations. In the case of the bottom stream this preferably takes place upstream of the inlet to the motor of the thermo-acoustic heat pump and in the case of the top stream product is preferably withdrawn after cooling (condensing), that is to say after passing through the pump of the thermo-acoustic heat pump.

It can be seen from the above that the method described above has very general applicability. This method can be used in all physicochemical methods conceivable in the state of the art and distillation is indicated in particular. More particularly, the method is suitable for the separation of liquids and the separation of propylene oxide and/or tertiary buthyl alcohol may be mentioned by way of example.

The invention also relates to an device for separating gases and/or liquids, comprising a vertical column provided with an outlet at the bottom and the top, there being means for heating the stream from the outlet at the bottom of the column and for cooling the stream from the outlet at the top of the column, wherein said means comprise a thermo-acoustic heat pump, wherein the motor of said thermo-acoustic heat pump has a connection to said outlet at the bottom of the reactor and a heat source and the pump of said thermo-acoustic heat pump has a connection to the outlet at the top of the reactor.

The invention will be explained in more detail below with reference to a few illustrative embodiments shown in the drawing. In the drawing.

In the figures a distillation column is indicated by 1. This column is provided with an inlet 2 for the product to be distilled. There is a bottom outlet 3 and a top outlet 4.

Figure 1:
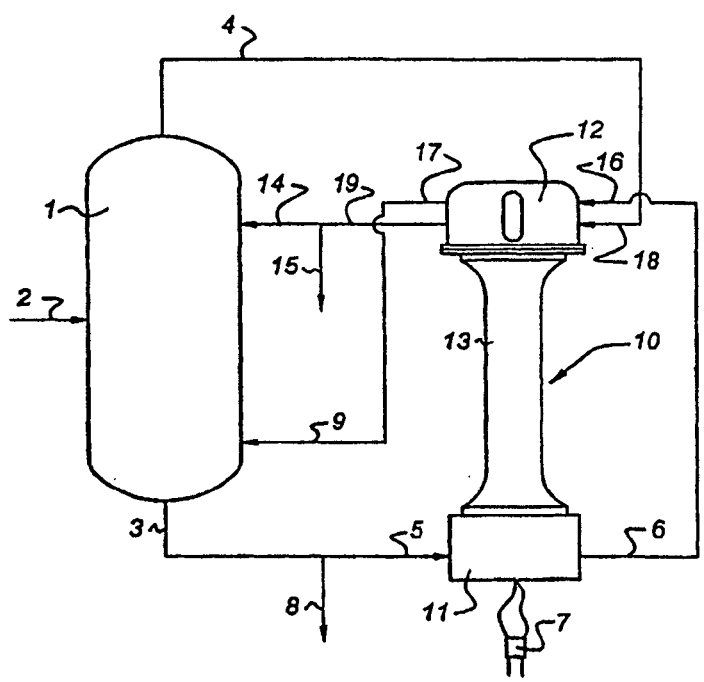
FIG. 1 shows a diagrammatic set-up of a first variant of the invention.

In the embodiment according to FIG. 1, the bottom outlet 3 is provided with a branch 8 for bottom product, whilst some of the bottom product is fed to the low-temperature inlet motor 11 of a thermo-acoustic heat pump 10. This thermo-acoustic heat pump consists of a motor 11 and of a pump 12, which are connected to one another by a resonator 13. The thermo-acoustic heat pump can be any pump known in the state of the art. A sound wave is generated in the motor of this pump. Such a wave can be generated in the motor by means of a temperature difference. This temperature difference is achieved in that the motor is provided with a burner 7 (hot section) and, some distance away therefrom, a cold stream formed by the bottom product that flows from the outlet 3 of the column. A wave is generated by means of this difference in temperature. In the pump this wave is re-converted to a temperature difference.

The bottom product leaves motor 11 at 6 and will have been heated to some extent at that location. The bottom product is then fed to high-temperature inlet pump 16 of pump 12 and, heated somewhat more, leaves pump 12 at high-temperature outlet pump 17 and is then recycled to the bottom of the column 1 at 9.

The top product from the column 1 is fed to the low-temperature inlet pump 18 of the pump and further cooled in the pump 12. Here the inlet temperature of top product at 18 is lower than the inlet temperature of bottom product at 16.

The relatively cold top product leaves the pump 12 at 19. A portion thereof is now available as product 15, whilst a portion thereof is recycled to the top of the column at inlet 14. Bottom product 8 and top product 15 are obtained in this way.

Figure 2:
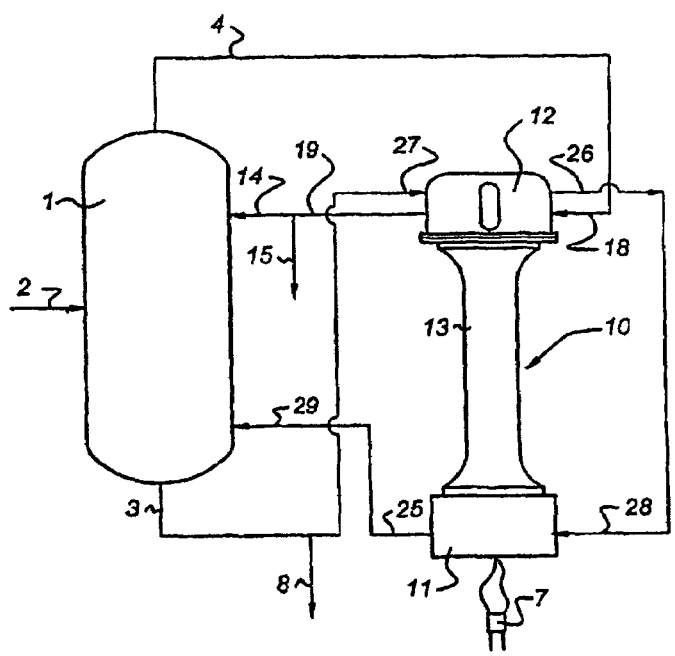
FIG. 2 shows a second variant, shown in the same way.

FIG. 2 shows a variant of the circuit discussed above with reference to FIG. 1. Here the bottom outlet 3 is again provided with a branch 8 for product, but the remainder of the bottom product is recycled to the hot temperature inlet of the pump indicated by 27. Having been heated somewhat, this product leaves the high-temperature outlet of the pump at 26 and is fed via line 28 to the low-temperature inlet of the motor of the thermo-acoustic heat pump. After issuing from the low-temperature outlet of the motor of the thermo-acoustic heat pump at 25, the product is fed via line 29 to the bottom part of the column 1.

The invention will be explained in more detail below with the aid of an example. It is assumed that a conventional column is used for the separation of a mixture consisting of propylene oxide and tertiary butyl alcohol and on the basis of this a calculation is carried out to determine the power for a conventional set-up (that is to say not according to the invention).

This separation can be carried out between 118° C. (bottom temperature) and 62° C. (top temperature). A typical power in the reboiler (lacuna), for example, approximately 10 MW.

When employing the invention as shown in FIG. 1, the following assumptions are taken as the starting point:

a burner temperature (7) of 600° C. is used to drive the motor of the thermo-acoustic heat pump. The burner efficiency is 100% and the efficiency of the motor of the thermo-acoustic heat pump is 40% of the Carnot efficiency. The resonator (13) has an efficiency of 100%, whilst the efficiency of the pump is approximately 50% of the Carnot efficiency.

The Carnot efficiency of the motor, which operates in the range between 600° C. and 118° C. (bottom temperature) is 65%. The acoustic power is 40% of this, that is to say 22% of the burner power. The remaining power (78%) is used to heat the bottom stream. The pump is in operation between 118° C. (bottom temperature) and 62° C. (top temperature). The Carnot efficiency is 7.0. The heat pumped up is 50% of this, that is to say 3.5 times the acoustic power. The power at high temperature is 3.5 times 22%=77% of the burner power. The power that is added in the motor to the bottom stream is added to this. This gives a total efficiency (coefficient of performance COP) of 155% or 1.55.

This means that for the above column with a heat requirement for the reboiler of 10 MW, a burner power of 10/1.55=6.45 MW can suffice, that is to say a saving of 3.55 MW.

Although the invention has been described above on the basis of an example, it will be understood that the invention can be employed with many other separations of products where there is a relatively large temperature difference between top stream and bottom stream. Such processes are generally known in the state of the art and it will immediately be clear to those skilled in the art which of these processes can be combined according to the invention with a thermo-acoustic heat pump. Such methods fall within the scope of the appended claims.

The invention claimed is:

1. Physicochemical method carried out in one or more reactors, wherein heat is supplied to one location in the reactor or reactors and heat is removed from another location in said reactor, the temperature at said one location being higher than the temperature at said other location and transport of heat from said other location to said one location being effected by means of a heat pump, said heat pump being a thermo-acoustic heat pump, wherein a motor of said thermo-acoustic heat pump has a feed for a cold stream, wherein said cold stream originates from said reactor or reactors.

2. Method according to claim 1, wherein the cold stream from said reactor is first fed through said motor and then to the pump of said thermo-acoustic heat pump.

3. Physicochemical method carried out in one or more reactors, wherein heat is supplied to one location in the reactor or reactors and heat is removed from another location in said reactor, the temperature at said one location being higher than the temperature at said other location and transport of heat from said other location to said one location being effected by means of a heat pump, said heat pump being a thermo-acoustic heat pump, wherein a motor of said thermo-acoustic heat pump has feed for a cold stream, wherein said cold stream originates from the high-temperature outlet of the pump of the thermo-acoustic heat pump.

4. Method according to claim 3, wherein the high-temperature inlet of the pump of the thermo-acoustic heat pump is connected to the one location.

5. Device for separating gases and/or liquids, comprising a vertical column provided with an outlet at the bottom and the top, there being means for heating the stream from the outlet at the bottom of the column and for cooling the stream from the outlet at the top of the column, said means comprising a thermo-acoustic heat pump, wherein the motor of said thermo-acoustic heat pump has connection to said outlet at the bottom of the reactor and an energy source, and the pump of said thermo-acoustic heat pump has a connection to the outlet at the top of the reactor.

6. Device according to claim 5, wherein said heat source is a burner.

7. Device according to claim 5, wherein the low-temperature outlet of the motor of the thermo-acoustic heat pump is connected to the high-temperature inlet pump of the pump of the thermo-acoustic heat pump.

8. Device according to claim 7, wherein the hot outlet of the pump of the thermo-acoustic heat pump is connected to an inlet of said column.

9. Device according to claim 5, wherein the low-temperature outlet of the pump of the thermo-acoustic heat pump is connected to an inlet of said column.

10. Device according to claim 5, wherein the high-temperature inlet of the pump of the thermo-acoustic heat pump is connected to the bottom outlet of the column, the high-temperature outlet of the pump of the thermo-acoustic heat pump is connected to the low-temperature inlet of the motor of the thermo-acoustic heat pump and the low-temperature outlet of the motor of the thermo-acoustic heat pump is connected to an inlet of the column, which inlet is located some distance away from the bottom.

* * * * *